Dec. 3, 1968     T. R. KENNEDY     3,414,659
METHOD AND APPARATUS FOR INDUCTION HEATING AND STIRRING
Filed Oct. 24, 1965     3 Sheets-Sheet 1

INVENTOR.
THEODORE R. KENNEDY
BY
*Seidel & Gonda*
ATTORNEYS.

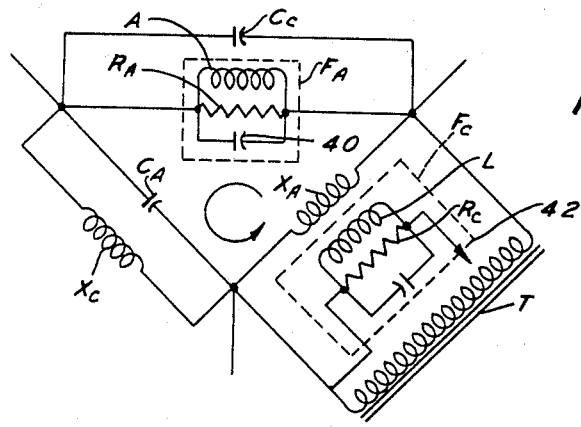
FIG. 11
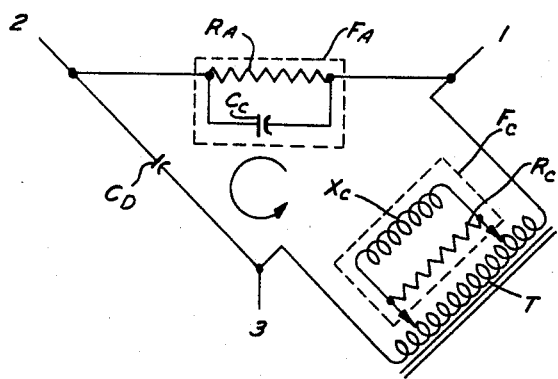
FIG. 10
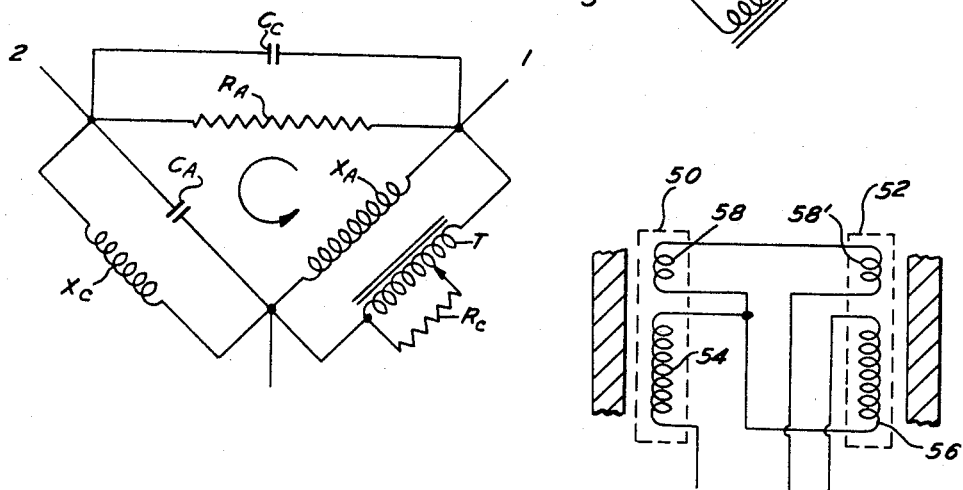
FIG. 9
FIG. 12

INVENTOR.
THEODORE R. KENNEDY
BY
Seidel & Gonda
ATTORNEYS.

United States Patent Office 3,414,659
Patented Dec. 3, 1968

3,414,659
METHOD AND APPARATUS FOR INDUCTION HEATING AND STIRRING
Theodore R. Kennedy, Willingboro, N.J., assignor to Inductotherm Corporation, Rancocas, N.J.
Filed Oct. 24, 1965, Ser. No. 504,655
21 Claims. (Cl. 13—26)

ABSTRACT OF THE DISCLOSURE

A method and apparatus is disclosed for increasing coil heating efficiency while simultaneously obtaining effective molten metal stirring using a polyphase source. The benefits of the invention are obtained by coupling a full coil to a partial coil to obtain efficient heating while maintaining sufficient magnetic coupling between coil parts for stirring.

This invention relates to a method and apparatus for induction heating and stirring. More particularly, this invention relates to a method and apparatus for induction heating and stirring in conjunction with multi-phase power sources.

In accordance with the principles of the present invention, effective induction heating combined with stirring and/or uni-directional axial motion of a molten metal is provided using combinations of a complete and partial coil electrically associated with predetermined phases of a multiphase source. The resultant arrangement of coils provides an increased heating efficiency over equally subdivided coils while connected to individual phases while at the same time accomplishing the dual purpose of heating the metal and stirring or moving it in a selected direction.

It therefore is an object of the present invention to provide a novel method and apparatus for heating and stirring molten metal.

It is yet another object of the present invention to provide a novel method and apparatus for heating and moving metal in a predetermined direction.

It is still another object of the present invention to provide a method and apparatus for heating and stirring molten metal using three phase power with split coils.

It is still another object of the present invention to provide a novel method of stirring and heating using a split coil.

It is yet another object of the present invention to provide a novel apparatus for stirring and heating using a split coil.

Other objects will appear hereinafter.

For the purpose of illustrating the invention, there are shown in the drawings forms which are presently preferred; it being understood, however, that this invention is not limited to the precise arrangements and instrumentalities shown.

FIGURE 9 is a schematic diagram illustrating the phase balance circuit used in conjunction with the embodiment of FIGURE 8.

FIGURE 10 is still another form of balance circuit to be used with the embodiment of FIGURE 8.

FIGURE 11 is a schematic diagram illustrating the phase balance circuit of FIGURE 9 with the equivalent circuit of the furnace shown.

FIGURE 12 is a modification of the embodiment shown in FIGURE 8 illustrating a star connection.

FIGURE 13a is another embodiment of the present invention.

FIGURE 13b is yet another embodiment of the present invention modifying the embodiment of FIGURE 13a.

FIGURE 14 is a schematic illustration of an application of the embodiment shown in FIGURE 13b.

FIGURE 15 is a schematic illustration of an application of the embodiment shown in FIGURE 13a.

Figure 1:
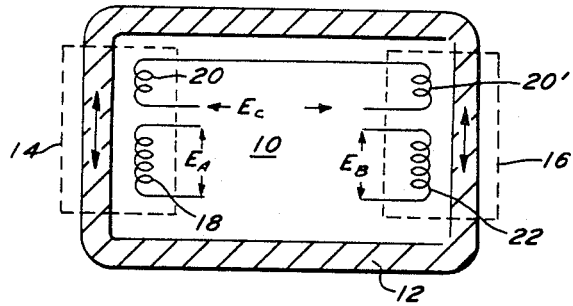
FIGURE 1 is a schematic view illustrating the closed loop of molten metal and coil assemblies in accordance with the present invention.

In metallurgical processing, it is often desirable to produce both heat and motion in a column of molten metal. It is possible to attain a combination of heating and motion or stirring by using appropriate induction coil construction in a multi-phase coreless induction furnace or heated appropriately connected to a power source.

If an induction coil is short relative to its diameter, which is the general case in melting furnaces, the magnetic coupling between individual coils powered by the separate phases of a multiphase source is great enough to adversely affect the electrical efficiency and power factor of the unit. This may be demonstrated as follows:

A single phase melting or heating coil is assumed to have a diameter to length ratio of unity. For a given melting charge of predetermined dimensions and electrical resistivity, the coil has $N_1$ turns to draw $I_1$ amperes at $E_1$ volts at a fixed frequency $f$. The same coil is assumed to have a power factor of 10%. Accordingly, the real input watts are $0.1 \times I_1 = W_1$. If the electrical efficiency is assumed to be 80%, then the coil loss is $I_1^2 R_c = (1.00 - .80) \times W_1 = 0.2 W_1$ and the net power delivered to the coupled charge is $0.8 W_1$. (In the instant calculation and all further calculations, the thermal conditions will be neglected.) This single phase calculation can be considered as optimum.

Applying the electrical principles of induction to the optimum case set forth above, there is $I_1 N_1$ ampere turns of magnetizing force applied to the metal charge to heat it at a rate equivalent to $0.8 W_1$ watt. If this be the optimum case, another coil arrangement must provide the same equivalent value of ampere turns in the space occupied by the charge to produce the same heating rate on the charge.

To simplify the analysis, a two phase source of alternating current will be considered. The two phase alternating current is substituted for the single phase discussed immediately above with the frequency remaining constant.

It is assumed that the single phase coil is divided in half and each half connected to one of the two phases. The voltages of the two phases will be assumed spaced apart 90 electrical degrees with phase one leading phase two. The two coils are assumed to be closely adjacent and because the combined diameter to length ratio was previously assumed to be unity, it now becomes two. The ratio of the mutual reactance between the coils to the reactance of a single coil may be shown to be approximately 0.32. That is, for a given voltage drop at unit current value in a first coil, an induced voltage drop will appear in the second coil having a value equal to 32% of the voltage across the first coil.

Evaluation of the current in each coil with equal two phase voltages impressed on the coils shows that the ratio of current in the second coil, assumed to be connected to the second phase, to the current in the first coil, assumed to be connected to the first phase, is:

$$\frac{I_2}{I_1} = -\left(\frac{jX_1 + X_m}{X_2 + jX_m}\right) \quad (1)$$

Where:

$X_1$ is the reactance of the first coil at frequency $f_1$.
$X_2$ is the reactance of the second coil at frequency $f_1$.
$X_m$ is the mutual reactance.

Assuming $X_1 = X_2 =$ unity and $X_m = 0.32$:

$$I_2 = -I_1\left(\frac{j + .32}{1 + j.32}\right) = -I_1(.581 + j.814) \quad (2)$$

The current $I_1$ is considered to be the unit vector for simplicity.

If the turns on each coil are taken as being 0.5 N, the resulting total ampere turns of both coils acting together are:

$$IN = .5I_1N + .5I_2N = .5N(I_1 + I_2) \quad (3)$$

Since $I_1$ is the unit value, the combined value of ampere turns will be approximately $$IN = I_1N(.21 - j.407) \quad (4)$$

$$IN(\cdot 457) \text{absolute} \quad (4a)$$

Equation 4 or 4a illustrate that for unit value of current in each coil, the two phase source results in significantly less ampere turns of energy being operatively applied to the load within the coils. The greater the coupling between coils, the lower will be the net ampere-turns applied to the load. That is easily demonstrated by substituting high values for $X_m$ in Equation 1 while maintaining $X_1 = X_2 =$ unit ohms.

The foregoing analysis demonstrates in generalized form, the results of using poly-phase sources for induction heating. Thus, the interaction of the coupled phases adversely affects performance of the coil assemblies, lowering the efficiency of the device. However, the stirring action is enhanced, within limits, because of the inter-phase coupling. But, this is at the expense of overall induction heating efficiency.

If commercial power sources are to be used, then it is necessary to consider the application of three phase currents. Here the analysis becomes more involved. The induction coil is divided into three sections of approximately equal turns and lengths. Thus, for a typical coil having a diameter to length ratio of unity, the individual phase coils would have a diameter to length ratio of 3. The 3-phase voltage potentials may be applied to the coils with a 60 degrees electrical phase progression from coil to coil. The 60 degrees phase progression results from a reversal of one of the phase vectors which are normally spaced apart 120 electrical degrees.

It is a straightforward matter to establish that for unit positive value for vector $I_3$:

$$I_1 = -I_3 \quad I_2 = 1.6jI_3$$

Since each of the coils have ⅓ the number of turns that existed on a single phase coil, then the total effective ampere-turns available for the load, using $I_3$ as the unit vector is:

$$(IN)_3 = I_3\left(\frac{N}{3}1.0 - \frac{N}{3}1.0 + \frac{N}{3}j1.6\right) \quad (5)$$

$$= j.533IN \quad (5a)$$

The foregoing demonstrates that even with an increased current ratio in the second coil, the ampere turns available for inductive heating is much lower than a single phase coil with unit current value for an equal total number of coil turns.

The losses in coil efficiency may be traced directly to the use of short coils. Thus, if a heating coil is long relative to its equivalent diameter, i.e., small diameter to length ratio, the coupling between multi-phase sections becomes less and less as the ratio drops and eventually may be neglected. Therefore, if the total coil is of sufficient length, it may be considered to be equivalent to a number of single phase loads, and the efficiency of single phase loads will be approximated. Furthermore, if the load to be heated is a material having high electrical conductivity, as for example, copper or aluminum, then the physical coupling between the load and the coil is very high, in fact, it is so high that the inter-phase couplings decrease and in many cases may be neglected.

However, the present invention is concerned with simultaneous heating or melting together with pumping or stirring of metals of relatively low conductivities. Thus, the apparently divergent purposes of electrical heating efficiency and stirring must be provided for. On the one hand, reasonable heating efficiency requires the avoidance of inter-phase coupling. On the other hand, good stirring or pumping action requires that there be inter-phase coupling. In addition, the conditions of relatively poor coil-load coupling, relatively poor load conductivity and limited space for total axial coil requirements must be provided for.

The present invention seeks to overcome these and other disadvantages.

Referring now to FIGURE 1, there is shown therein a schematic illustration of a heating and stirring apparatus designated generally as 10. The apparatus shown in a closed path or circuit of molten metal which is to be kept in motion while its temperature is raised or maintained by induction. This type of apparatus is representative of several types to which the principles of the present invention may be applied.

As shown, the apparatus 10 includes a closed loop channel 12 through which molten metal is caused to flow. The channel 12 is represented schematically. A pair of coil assemblies 14 and 16 are mounted in association with opposite legs of the channel. It is to be understood that this is a schematic representation and merely illustrates that the coil assemblies 14 and 16 are to be mounted on the closed loop channel in spaced apart relation along the molten metal path.

In accordance with the description to be given below, three phase power will be used to heat and move the molten metal in the closed loop 12.

The coil assembly 14 comprises a first induction coil 18, to which a first phase $E_A$ of three phase voltage is to be applied, and a second coil 20, to which a portion of a third phase $E_C$ is applied. The coil assembly 16 comprises a first coil 22 to which the second phase $E_B$ is applied and second coil 20' to which a portion of a third phase $E_C$ is applied. Thus, the apparatus 10 comprises two coil assemblies each having a complete coil and a portion of a shared coil. This differs from the heretofore mentioned concept of providing two single phase coil assemblies split into three coils, each connected to one phase of the three phase network with 60 degree electrical progression. The connection shown in FIGURE 1 is such that motion due to phase progression is additive to advance the entire column in a selected direction.

The advantage of the foregoing coil connection can be illustrated by the following analysis:

To simplify the analysis, assume the coil assemblies 14 and 16 have a diameter to length ratio equal to 1, although this is not a necessary requirement. 61.45% of the turns are assigned to coil 18 in assembly 14 and 38.55% of the turns to coil 20. Similarly, 61.45% of the turns are assigned to coil 22 and 38.55% to coil 20' in assembly 16. The phase connections are made to maintain sixty degree electrical phase progression from B (coil 22) to C (coils 20' and 20) to A (coil 18).

Since each coil assembly 14 and 16 has a diameter to length ratio of one and is divided into two parts of 61.56% and 38.44% of the axial length, with a corresponding number of turns, the ratio of the mutual reactance between the two coils for each assembly (18, 20 and 22, 20'') to the reactance of the larger coil in each assembly (18 and 22) is approximately 22.1%. The same ratio to the smaller coils in each assembly (20 and 20') is approximately 43.8%. The percentage division set forth above therefore divides the coil assemblies into two sections of which the induction of the larger section is substantially twice the inductance of the smaller section.

For the entire apparatus 10, there are three inductances. Inductance A having unit value, inductance B also of unit value and a series pair of inductances adding up to unit value which may be called inductance C. A first coil 20, representing one half the total of inductance C, is coupled to inductance A. Another coil 20', representing the second half of inductance C, is coupled to inductance B. The interphase coupling between A and C and between C and B provides uni-directional axial transfer of energy necessary to sustain axial motion of a molten metallic load.

By proper manipulation of the A, B and C inductances, and the mutual inductances, it is possible to arrive at expressions which indicate the magnitude of the vector relationship of the currents in phases A, B and C.

Unity value is assumed for a current vector $I_A$ at frequency $f$ and voltage $E_A$ with a 60 degree electrical progression from $E_B$ to $E_C$ to $E_A$. The coil ratios are as indicated above.

Straightforward mathematical calculation reveals the following:

$$\text{If } I_A = 1.0 + j \quad (6a)$$

$$\text{then } I_S = .354 + j1.1 \quad (6b)$$

$$\text{and } I_B = -.812 + j.584 \quad (6c)$$

The ampere turns in assembly 14 can be calculated as follows assuming as before that 61.45% of the turns are on coil A at unit current and 38.55% of the turns are on coil C at current $I_c$ of Equation 6b:

$$(IN)_3 = N[.6145 \times 1 + .3855(.354 + j1.1)] \quad (7)$$

which reduces to:

$$(IN)_3 = .861 \text{ absolute} \quad (8)$$

Now, comparing Equation 8 with Equation 5a it will be noted that the net value of ampere turns in Equation 8 is substantially higher than that of Equation 5a. Inasmuch as induction heating energy is generally a function of the ampere turns squared, the one and one half phase coil assemblies 14 and 16 at unit current are approximately $(.861/.533)^2$ or 2.6 times as effective as the three phase coil subdivided into three equal parts. Moreover, the phase currents are more nearly in equal balance among three phases. This ultimately means that less expensive equipment will be necessary to bring about complete phase balancing.

Figure 2:
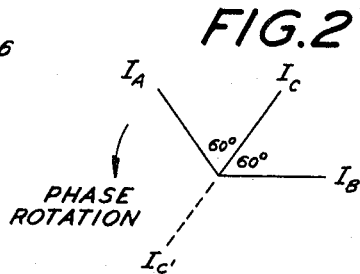
FIGURE 2 is a current vector diagram of the current to be applied to the coil assemblies of FIGURE 1.

FIGURE 2 is a vector diagram showing the phase rotation of the current supplied to the individual coils 18, 22 and 20-20'.

Figures 3, 4:
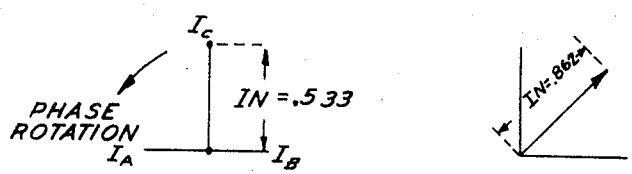
FIGURE 3 is a vector diagram showing the relative ampere-turns for a prior art connection.
FIGURE 4 is a vector diagram showing the overall ampere-turns of the coil assemblies illustrated in FIGURE 1.

FIGURE 3 is a vector diagram illustrating the ampere turn relationship for a unity coil subdivided into three equal parts.

FIGURE 4 is a vector diagram showing the ampere turn relationship for the coil assemblies 14 and 16 of FIGURE 1. Thus, FIGURES 3 and 4 diagrammatically compare the relative overall ampere-turn value of the three part and the one and one half part coils for unit current.

In the foregoing analysis, the effect of excess current in phase C on the overall efficiency has been neglected. However, such effects do not modify in any significant degree the conclusions to be drawn from the foregoing calculations.

From the foregoing, it will be observed that effective induction heating has been combined with uni-directional axial motion or stirring in a closed channel system. This is accomplished by the advantageous uses of two coil assemblies, each assembly comprising the equivalent of one and one half phases of a sixty degree phase progression power supply. The two coil assemblies have substantially no magnetic coupling between them but there is substantial magnetic coupling between the full and half value phase coils comprising each assembly.

Figure 5:
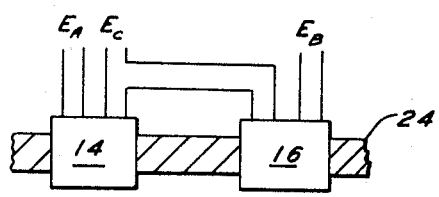
FIGURE 5 is a schematic diagram of a single channel application of this invention.
Figure 6:
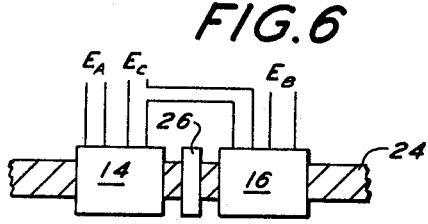
FIGURE 6 is a schematic diagram of the shielding which may be used in conjunction with a single channel furnace.
Figure 7:
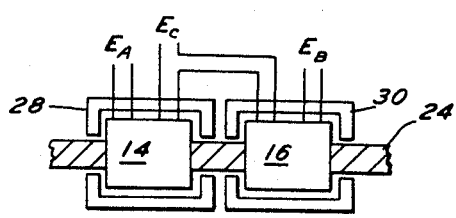
FIGURE 7 is a schematic diagram illustrating the magnetic shunting used with the embodiment illustrated in FIGURE 5.

Although the concept of this invention has been applied to the closed loop channels 12, it is equally applicable to an open ended channel. In FIGURE 5, the coil assemblies 14 and 16 are shown applied to a single channel 24 with the phase connections being exactly the same as those illustrated in FIGURE 1. As with the embodiment shown in FIGURE 1, magnetic coupling between the coil assemblies 14 and 16 must be avoided. This is accomplished in any one of several ways. The apparatus shown in FIGURE 5 avoids magnetic coupling between assemblies 14 and 16 by spacing them far enough apart.

Where space is limited, magnetic shielding 26 may be used as shown in FIGURE 6. If magnetic shielding 26 is not effective, then magnetic shunts 28 and 30 may be used as illustrated in FIGURE 7.

Figure 8:
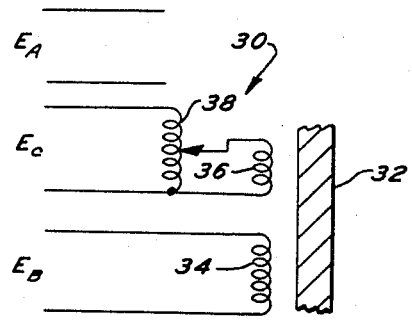
FIGURE 8 is a schematic diagram illustrating still another embodiment of the present invention.

Under certain circumstances, it may be necessary or desirable to use only a single coil assembly to provide combined heating and stirring of molten metal motion. Apparatus for so accomplishing this is illustrated in FIGURE 8. As shown, the coil assembly designated generally as 30 is inductively coupled to the open ended channel 32. The coils so inductively coupled to the channel 32 are designated 34 and 36 respectively. The combined length of coils 34 and 36 is assumed to be unity with the number of coil turns proportioned as set forth above. Thus, coil 34 will have approximately 61.45% of the turns and coil 36 will have 38.55% of the turns. Coils 34 and 36 are inductively coupled so as to produce a mutual reactance between them. Since the shorter coil 36 is to have power capabilities appropriate to its length relative to the longer coil 34, a transformer or autotransformer 38 may be used to adjust the phase voltage to the proper value.

If the power supply system is large, the three phase circuit imbalance created by the connections shown in FIGURE 8 will be negligible. However, if better phase balancing is required, a circuit similar to FIGURES 9, 10, or 11 may be used. These circuits employ auto-transformers and balancing inductive and capacitive reactances which may be appropriately adjusted to provide satisfactory phase balancing.

It is the normal practice to correct most induction furnaces to unity power factor by means of shunting capacitors. Accordingly, the real or watt-energy absorbed by an induction furnace may be represented by a resistance shunted with an inductance or capacitance, depending upon whether the furnace is under or over corrected, i.e., the load is leading or lagging.

The balanced circuit shown in FIGURE 9 comprises a furnace load that is subdivided into two sections in accordance with the principles illustrated in FIGURE 8. The separate section forming the coil assemblies are designated $R_A$ and $R_C$.

FIGURE 11 is a representation of the same circuit shown in FIGURE 9, but with the furnace circuit sections represented by the designation $F_A$ and $F_C$. The equivalent circuit of the furnace coils is shown within the dotted box representing the furnace coils $F_A$ and $F_C$. Thus, the coil load $R_A$ is shown as a resistance in parallel with an inductance A and capacitance 40. Capacitance 40 will also represent the power factor correcting element. Furnace $F_C$ is represented by an equivalent circuit in which $R_C$ is the load, L is the inductance of the furnace coil, and capacitor 42 represents the capacitance of the furnace circuit including its power factor correcting element.

In FIGURE 9, phase balancing capacitors are designated $C_A$ and $C_C$. The phase balancing reactances are designated $X_A$ and $X_C$. The auto-transformer T provides appropriate voltage across the short coil section represented by the load $R_C$.

The load $R_A$ is the equivalent of a single phase induction furnace corrected to unity power factor. When the induction furnace $F_A$ is connected to one phase of a three phase source, the remaining two phases are balanced by the capacitance $C_A$ and the reactant $X_A$. The capacitance $C_A$ and reactant $X_A$ are adjusted so that, assuming three equal phase voltages, the kva. rating of $C_A$ and $X_A$ is $$\frac{1}{\sqrt{3}}$$

or 57.7% of the kw. rating of $R_A$.

The furnace section as represented by the load $R_C$ is considered separately. Balancing capacitor $C_C$ and balancing reactance $X_C$ properly balance the kw. load represented by $R_C$ when the kva. of $C_C$ and $X_C$ has the relationship of 57.7% or $$\frac{1}{\sqrt{3}}$$

of the kw. rating of $R_C$.

For proper phase balancing, the sequence of load R, balancing capacitor C and balancing inductance X must agree with the power source phase rotation. If the present coil assemblies use a sixty degree phase separation between adjacent coils, it follows that the required sixty degree phase progression is provided by the simple reversal of one of the 120 degree phase vectors of the three phase source.

FIGURE 10 shows a resultant of FIGURE 9 where the load $R_C$ is equal to one half the load $R_A$ with appropriate lagging and leading power factor corrections of the induction unit $F_C$ and $F_A$. The inductance $X_C$ across load $R_C$ represents the normal lagging power factor of an induction heater coil shunted with an insufficient capacitance to provide unity power factor at the furnace terminals. Since it is permissible for an induction furnace to operate without sufficient shunting capacitors, there is no difficulty encountered in under capacitance correction since many induction furnaces may be as low as 10% power factor without capacitive correction. Such under capacitance correction makes $F_C$ in FIGURE 10 equivalent to the combination $R_C$ shunted with a reactance equivalent to $X_A$ of FIGURE 9. Overcorrecting $F_A$ results in the combination load $R_A$ shunted with a capacitance equivalent to $C_C$ of FIGURE 9. In the embodiment shown in FIGURE 9, capacitance $C_A$ has a greater kva. rating than the inductance reactance $X_C$. Accordingly, $C_D$ in FIGURE 10 is equivalent to the difference in the kva. values.

As stated above, the load $R_C$ in FIGURE 10 is one half the value of the load $R_A$. On the basis, the following terms are quickly derived from the principles set forth above:

$R_A = 1$ kw. (kva.) units.
$R_C = 0.5\ R_A$ kva. (kw.).
$C_A = .289\ R_A$ kva.
$X_C = 577\ R_A$ kva.
$C_D = .289\ R_A$ kva.

Since $F_A$ is over-corrected, it has a leading power factor of approximately 96% and $F_C$ has a lagging power factor of approximately 65.6%. Current in the supply lines 1, 2 and 3 therefore feed to a balanced resistance load of one and one half kw. units.

Heretofore, the present invention has been described in conjunction with a delta connection. FIGURE 12 shows a star connection using two coil assemblies 50 and 52. When connected as shown, the coil assemblies produce the required 60 degree electrical angle between axially adjacent coils 54, 56 and split coil 58–58'. The coils illustrated in FIGURE 12 are wound in the same spiral direction used with respect to the coils in FIGURE 1.

Figures 13A, 13B:
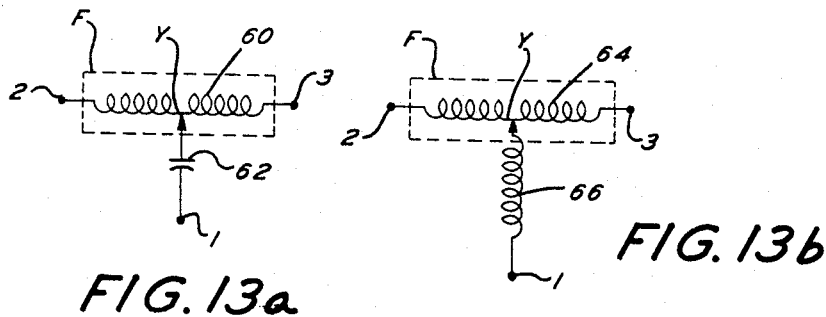

FIGURES 13a and 13b illustrate another embodiment of this invention. In certain situations, it is desirable to use a single coil to obtain heating with as high efficiency as possible. But in addition, a small amount of interdirectional stirring is desirable. This is accomplished by connecting a single phase induction coil 60 across one phase of a three phase source designated 1, 2 and 3. As shown, the coil 60 is connected to the phase lines 1 and 2. The third phase line 3 is tapped into the induction coil through a capacitor 62. In FIGURE 13b, the coil 64 is connected the same as coil 60 but is tapped by a reactance 66.

The letter F in both FIGURES 13a and 13b designates a furnace. If the furnace F consists of two equal coils having substantially zero coupling between them, it requires only straight-forward mathematical calculations to demonstrate that when the capacitive reactance Zc of capacitor 62 equals five times the inductive reactance of a single half of coil 60, then the current flowing from line 2 to point Y is about 22 electrical degrees out of phase with the current flowing from Y to line 3. The approximate in phase ampere-turns of the two coil halves are 93% of the total ampere-turns available if coil 60 were operated on a single phase basis. The value of capacitor 62 may be increased to any value consistent with the necessary compromise between heating efficiency and required uni-directional stirring generated by the phase angle of the flux in the two sections of coils 62. The point Y may be selected as required if there is need to have the phase node displaced for processing or operating reasons. Appropriate phase rotating networks may be used to provide balanced three phase loading equivalent to single phase loading of coil 62.

From the foregoing, the operation of coil 66 will be obvious to those skilled in the art and therefore needs no further discussion.

Figures 14, 15:
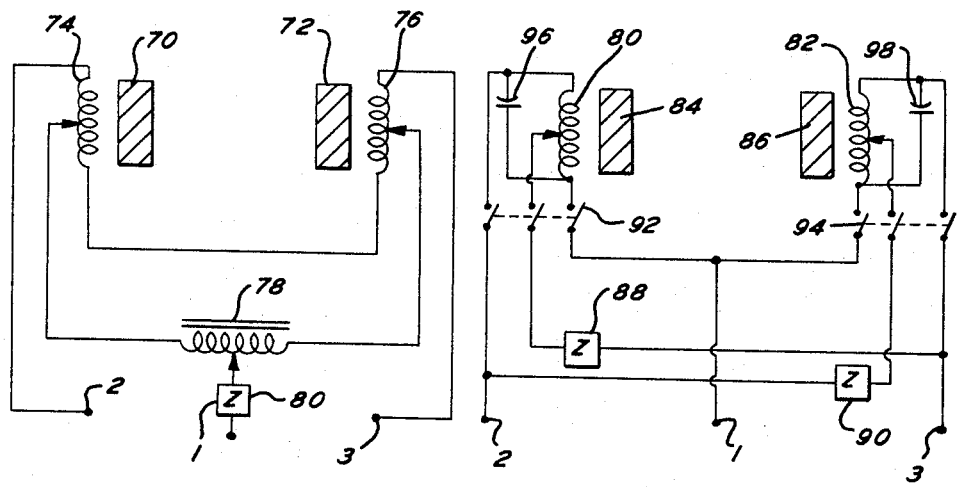

If two coils similar to those shown in FIGURES 13a and 13b are required, a circuit similar to FIGURE 14 can be used. 70 and 72 represent the molten metal load while 74 and 76 represent the tapped furnace coils. Coils 74 and 76 are separate induction coils used to generate both heating and stirring in their respective loads. 78 is a center tapped auto-transformer. The center tap of auto-transformer 78 is connected to a first phase through the impedance 80. As thus connected, the impedance 80 comprises the required phase splitting impedance taught and is common to coils 74 and 76. Thus, a single impedance is used to provide the equivalent of either capacitor 62 or reactance 66 shown in FIGURE 13a and 13b.

In FIGURE 15, the principles of the invention illustrated in FIGURES 13a and 13b are applied to two coils 80 and 82 which are adapted to energize the loads 84 and 86. By connecting the coils 80 and 82 as shown in FIGURE 15, they may be used on separate phases of a three phase line and independently operated by providing appropriate switching. As shown, the coil 80 is tapped through an impedance 88 to the third phase line. The coil 82 is tapped through impedance 90 to the second phase line. Coil 80 is connected across the first and second phase lines and coil 82 is connected directly across the first and third phase lines. The switching for independent operation is illustrated by the switches 92 and 94. Appropriate power factor correcting capacitors 96 and 98 are provided across coils 80 and 82 respectively.

If desired, the power factor of coils 80 and 82 may be designed to be leading and lagging in conjunction with the phase rotation of the three phase supply 1, 2 and 3. This essentially eliminates the need for phase rotating means to balance unequal phase loading.

Figure 16:
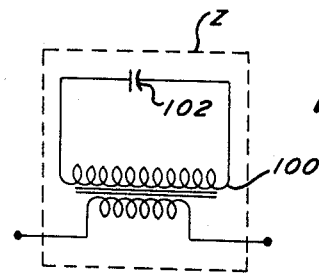
FIGURE 16 is a schematic illustration of an impedance to be used with the circuits of FIGURES 14 and 15.

In FIGURES 14 and 15, the phase splitting impedance Z has been represented schematically. A preferred form of impedance Z is shown in FIGURE 16. As shown, impedance Z incorporates a transformer 100 to match a selective inductive or capacitive impedance to the current or voltage requirements needed. FIGURE 16 shows the impedance 102 as being capacitive. However, it will be readily recognized that a reactive impedance may be substituted for the capacitor 102. The transformer ratio may be made variable to adjust phase splitting according to the demands of the system.

The present invention may be embodied in other specific forms without departing from the spirit or essential attributes thereof and, accordingly, reference should be made to the appended claims, rather than to the foregoing specification as indicating the scope of the invention.

I claim:

1. An induction heating and stirring apparatus comprising a first coil assembly, a second coil assembly, said first and second coil assemblies being magnetically isolated, said first coil assembly including a first coil adapted to be connected to one phase of a three phase source and a first partial coil adapted to be connected to another phase of said source and a second partial coil, said second coil assembly including said second partial coil and a second coil, said second coil being adapted to be connected to a third phase of said source, said second partial coil being adapted to be connected to said first partial coil and to said other phase of said source, said coils being adapted to be connected to said source with sixty degree phase separation and phase rotation in the relation: first coil, first and second partial coil, and second coil.

2. Apparatus in accordance with claim 1 wherein said first and second coil assemblies are magnetically associated with a closed loop channel for conveying molten metal.

3. Apparatus in accordance with claim 1 wherein said first and second coil assemblies are magnetically associated with a channel for conveying molten metal.

4. Apparatus in accordance with claim 1 wherein said first and second coils and said partial coils are connected in delta.

5. Apparatus in accordance wtih claim 1 wherein said first and second coils and said partial coils are connected in star.

6. An induction heating and stirring apparatus comprising a first coil adapted to be connected to one phase of a three phase line, a second coil adapted to be connected to a second phase of said three phase line, said second coil being magnetically coupled to said first coil, said second coil being capable of producing a lesser amount of magnetic energy than said first coil, and phase balancing means, said phase balancing means including means for correcting said first and second coils to leading and lagging power factors, and impedance means including a capacitive or reactive impedance adapted to be connected across said third phase.

7. An induction heating and stirring apparatus comprising a first coil connected to one phase of a three-phase source, a second partial coil connected to another phase of said source, said first and second coil being connected in a predetermined phase progression, said second coil being magnetically coupled to said first coil, and said second coil being wound to produce less heating and stirring magnetic energy than said first coil.

8. Apparatus in accordance with claim 7 wherein said second coil is connected to an auto-transformer.

9. An induction heating and stirring apparatus including an induction heating coil connected between two phases of a three phase source, phase dividing impedance means connected to another phase of said source and an intermediate tapping point on said coil.

10. An induction heating and stirring apparatus comprising a first coil, a second coil, said second coil being magnetically isolated from said first coil, said second coil being electrically connected to said first coil, said first coil being connected to one phase of three phase line, said second coil being connected to a second phase of said three phase line, said first and second coils having intermediate tapping points, said intermediate tapping points being connected to a phase dividing impedance, said impedance being adapted to be connected to a third phase of said source.

11. A method of simultaneously heating and stirring molten metal by induction comprising the steps of connecting a first single phase coil to one phase of a three phase source, connecting a second single phase coil to another phase of a three phase source, and connecting a first and second partial coil to a third phase of a three phase source, magnetically coupling one of said partial coils to said first single phase coil and magnetically coupling said second partial coil to said second single phase coil, and energizing said first coil, said second coil, and said partial coils in phase sequence as follows: said first single phase coil, said partial coils, and said second single phase coil.

12. Induction heating and stirring apparatus comprising an induction heating coil adapted to be energized by one phase of a multi-phase source, said heating coil being wound to produce a predetermined amount of heating and stirring magnetic energy when energized by a predetermined current, a second induction coil being adapted to be energized by another phase of said multiphase source, said second coil being magnetically coupled to said first coil and being wound to produce less heating and stirring magnetic energy than said first mentioned coil when simultaneously energized.

13. An induction heating and stirring apparatus in accordance with claim 7 wherein said first coil is wound with 61.45% of the turns and said second coil is wound with 38.55% of the turns.

14. An induction heating and stirring apparatus comprising a first coil assembly, a second coil assembly, said first and second coil assemblies being magnetically isolated, said first coil assembly including a first coil adapted to be connected to one phase of a multi-phase source and a first partial coil adapted to be connected to another phase of said source and to a second coil, said second coil assembly including said second partial coil and a second coil, said second coil being adapted to be connected to a third phase of said source, said second partial coil being adapted to be connected to said first partial coil and to said other phase of said source.

15. Induction heating and stirring apparatus comprising an induction heating coil, said induction heating coil being adapted to be energized by one phase of a multi-phase source, said coil being wound to produce a predetermined amount of magnetic energy when energized by a predetermined current, a second induction coil adapted to be energized by another phase of said multiphase source, said second coil being magnetically coupled to said first coil and being wound to produce a lesser amount of magnetic energy when energized by said source, and phase balancing means associated with said first and second coils.

16. Induction heating and stirring apparatus in accordance with claim 15 wherein said phase balancing means includes an inductive and capacitive reactance connected to the second and third phase of said three phase line for balancing said first coil and a capacitive and inductive reactance connected to the first and third phases of said three-phase line for balancing said second coil.

17. An induction heating and stirring apparatus in accordance with claim 9 wherein said phase dividing impedance is a capacitive impedance.

18. An induction heating and stirring apparatus in accordance with claim 9 wherein said phase dividing impedance is an inductive impedance.

19. An induction heating and stirring apparatus comprising a first coil, a second coil, said second coil being magnetically isolated from said first coil, said first coil being electrically connected to one phase of a three-phase line, said second coil being connected to a second phase of a three-phase line, said first and second coils having intermediate tapping points, said first coil being connected from its intermediate tapping point through a phase dividing impedance to the phase of said three-phase line to which it is not otherwise connected, said second coil intermediate tapping point being connected to a phase dividing impedance to a phase of said three-phase line to which said second coil is not otherwise connected.

20. An induction heating and stirring apparatus in accordance with claim 19 wherein switching apparatus is provided for independently operating said first and second coils.

21. An induction heating and stirring apparatus in accordance with claim 14 wherein said first coil is wound with 61.45% of the turns and said first partial coil is wound with 38.55% of the turns which comprises the first coil assembly, and said second coil is wound with 61.45% of the turns and said second partial coil is wound with 38.55% of the turns which comprises said second coil assembly.

References Cited

UNITED STATES PATENTS

| | | | |
|---|---|---|---|
| 2,748,240 | 5/1956 | McArthur | 219—10.75 |
| 2,811,623 | 10/1957 | Guthrie | 219—10.75 X |
| 2,849,584 | 8/1958 | Tudbury | 219—10.75 |
| 2,960,556 | 11/1960 | Fredriksson | 336—212 |
| 2,968,685 | 1/1961 | Tostmann | 13—26 |
| 3,053,920 | 9/1962 | Seitz | 13—26 |

RICHARD M. WOOD, *Primary Examiner.*

L. H. BENDER, *Assistant Examiner.*